US012678369B2

(12) United States Patent
Titov et al.

(10) Patent No.: US 12,678,369 B2
(45) Date of Patent: Jul. 14, 2026

(54) EMS COT HAVING BUILT-IN MECHANICAL CPR DEVICE

(71) Applicant: PHYSIO-CONTROL, INC., Redmond, WA (US)

(72) Inventors: Alexey Titov, Woodinville, WA (US); Fred Chapman, Newcastle, WA (US); Tyson Taylor, Bothell, WA (US)

(73) Assignee: PHYSIO-CONTROL, INC., Redmond, WA (US)

(*) Notice: Subject to any disclaimer, the term of this patent is extended or adjusted under 35 U.S.C. 154(b) by 1106 days.

(21) Appl. No.: 17/737,396

(22) Filed: May 5, 2022

(65) Prior Publication Data

US 2022/0354739 A1 Nov. 10, 2022

Related U.S. Application Data

(60) Provisional application No. 63/184,342, filed on May 5, 2021.

(51) Int. Cl.
*A61H 31/00* (2006.01)
*A61G 1/04* (2006.01)

(52) U.S. Cl.
CPC ............. *A61H 31/006* (2013.01); *A61G 1/04* (2013.01)

(58) Field of Classification Search
CPC .................................................... A61H 31/006
See application file for complete search history.

(56) References Cited

U.S. PATENT DOCUMENTS

| | | | |
|---|---|---|---|
| 8,690,804 B2 | 4/2014 | Nilsson et al. | |
| 8,876,742 B2 | 11/2014 | Centen | |
| 9,585,603 B2 | 3/2017 | Centen | |
| 10,117,804 B2 | 11/2018 | Nilsson et al. | |
| 10,179,086 B2 | 1/2019 | Centen | |
| 2017/0071820 A1* | 3/2017 | Illindala ............... | A61H 31/006 |
| 2019/0117499 A1 | 4/2019 | Härdig et al. | |
| 2019/0117501 A1 | 4/2019 | Chapman et al. | |
| 2019/0117502 A1 | 4/2019 | Arbuck et al. | |
| 2022/0151866 A1* | 5/2022 | Freeman .................. | A61G 7/16 |

* cited by examiner

*Primary Examiner* — LaToya M Louis
(74) *Attorney, Agent, or Firm* — Miller Nash LLP

(57) ABSTRACT

Examples of the disclosure are directed to a patient support apparatus including a frame having a deck structured to support a patient, a retention device structured to secure the patient on the deck, and a compression device attached to the frame at the deck, the compression device including a compression mechanism structured to extend toward the patient and retract at least partially below the deck. In some examples, the compression device includes an inflatable bladder or a rotating cam having a lobe to provide the compression.

14 Claims, 6 Drawing Sheets

EMS COT HAVING BUILT-IN MECHANICAL CPR DEVICE

CROSS-REFERENCES TO RELATED APPLICATIONS

This patent application claims the benefit of U.S. provisional patent application No. 63/184,342, entitled "EMS COT HAVING BUILT-IN MECHANICAL CPR DEVICE," filed May 5, 2021, the disclosure of which is incorporated herein by reference in its entirety.

TECHNICAL FIELD

The subject matter is related to systems and methods for mechanical cardiopulmonary resuscitation.

BACKGROUND

Mechanical compression devices for Cardiopulmonary resuscitation (CPR) are being increasingly adopted by emergency medical services around the world. CPR is a lifesaving technique useful in many medical emergencies, for example following a heart attack or near drowning, in which a person's breathing and/or heartbeat has stopped. Chest compressions are a primary aspect of CPR and involve firmly compressing the chest of the person to facilitate oxygenated blood to remain flowing to the brain and other vital organs until more definitive medical treatment can restore a normal heart rhythm.

Patient positioning has been used in emergency medical services (EMS) cots and gurneys to enhance patient comfort, prevent skin breakdown, improve drainage of bodily fluids, and facilitate breathing. One of the goals of patient positioning has been maximization of ventilation to improve systematic oxygenation. Various studies have demonstrated the beneficial effects of body positioning and mobilization on impaired oxygen transport. The support of patients in a prone position can be advantageous in enhancing extension and ventilation of the dorsal aspect of the lungs.

That is, some critically ill patients, such as those with COVID-19, are placed in a prone position to help facilitate breathing. Rotating a patient from prone to supine, or vice versa, can be time consuming, and if a patient goes into cardiac arrest while prone, it may not be possible to flip patients to a supine position and provide chest compressions. This can result in patients that would otherwise benefit from CPR from receiving the necessary chest compressions.

Examples of the disclosure address these and other deficiencies of the prior art.

BRIEF DESCRIPTION OF THE DRAWINGS

Aspects, features and advantages of examples of the present disclosure will become apparent from the following description of examples in reference to the appended drawings in which.

DETAILED DESCRIPTION

Examples of the disclosure are directed to EMS cots and/or gurneys having a mechanical compression device attached that can provide compressions to a patient when in a supine or prone position. The cot and/or gurney can have a built-in compression device, either below or within a patient support deck.

Figure 1:
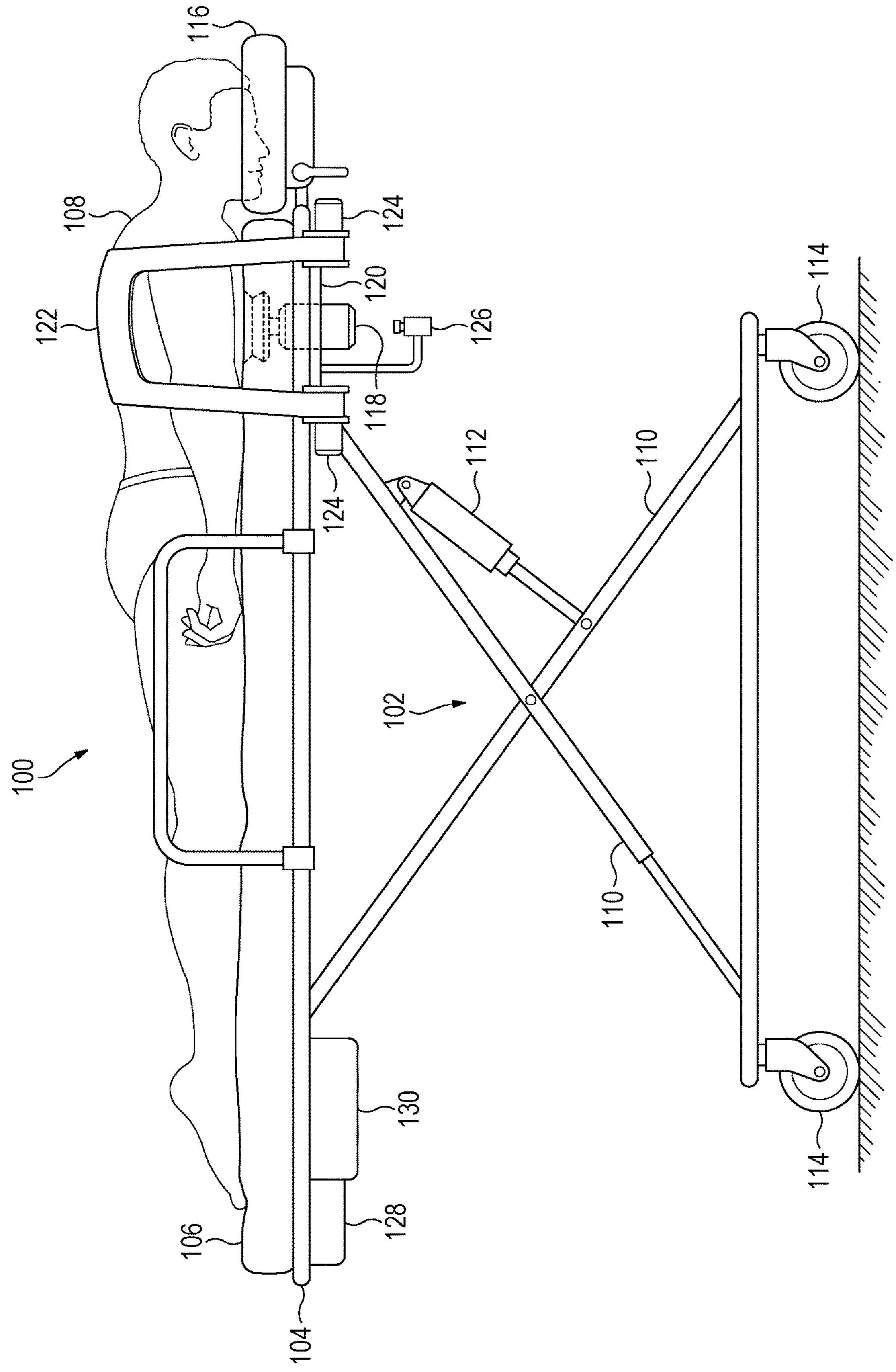
FIG. 1 is a side view of a patient support apparatus having a compression device according to some examples of the disclosure.

FIG. 1 illustrates a patient support apparatus 100 in accordance with an exemplary embodiment. The patient support apparatus 100 includes a frame 102 for supporting a deck 104. In some examples, and as illustrated in FIG. 1, a mattress 106 may be provided on the deck 104 to support a patient 108. However, examples of the disclosure do not require a mattress 106 and in some examples, the patient may be supported directly by the deck 104. The patient support apparatus 100 of FIG. 1 can be an ambulance cot supporting the patient 108 in a supine or prone position above a floor surface. In still other example, the patient support apparatus 100 may comprise a hospital bed, stretcher, surgical table, wheelchair, chair, or similar apparatus utilized in the transport or support of a patient generally positioned in the supine, incline, and/or decline positions. The patient support apparatus 100 can include additional components not shown, such as, but not limited to patient rails, additional actuators, electronics, etc.

The frame 102 includes one or more frame members 110 and frame actuators 112 to raise or lower the deck 104. The construction of the frame 102 may take on any known or conventional design, and is not limited to that specifically shown and/or set forth above. The frame members 110 may include wheels 114 in some examples. The wheels 114 can facilitate transport over surfaces. In the embodiment shown in FIG. 1, the wheels 114 are caster wheels and adapted to rotate and swivel during transport. It should be understood that various configurations of the wheels 114 are contemplated, for example non-steerable, steerable, non-powered, powered, or combinations thereof. Additional wheels can also be included, or conversely, the patient support apparatus 100 may not comprise any wheels.

Figure 2:
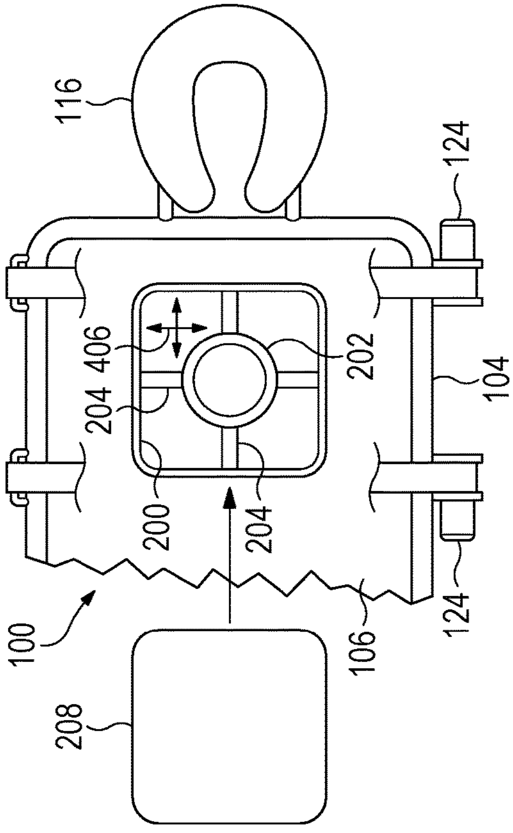
FIG. 2 is a top view of the patient support apparatus of FIG. 1.

A head support 116 can be attached to the patient support apparatus 100. The head support 116, for example, can be attached to the deck 104 as shown in FIG. 1. However, in some examples, the head support 116 can be attached to the frame 102. The head support 116 can support the head of a patient 108 when lying in the prone position. As shown in FIG. 2, the head support 116 can include an opening or an aperture to accommodate the face of a patient when laying in the prone position. The head support 116 may be removable or may be attached by a locking hinge. If the head support 116 is attached by a locking hinge, then the head support 116 may be rotated downward when not in use.

The patient support apparatus 100 also includes a compression device 118 attached to either the frame 102 or the deck 104. The compression device 118 can be any known compression device such as, but not limited to, a reciprocating plunger, a belt-type compression device, or an inflatable member. The compression device 118, for example, may attach to the bottom surface of the deck 104 by a flange 120. In some examples, as shown in FIG. 1, the compression device 118 can include a reciprocating plunger that can retract at least partially below the surface of the deck 104 toward the ground surface. The plunger can be reciprocated using any known means, such as a linear actuator.

In some examples, the plunger may be similar to the plunger in known chest compression devices that are used to administer chest compressions to patients in a supine position placed in a support structure. For example, the plunger may include a motor that drives a ball screw in a reciprocating manner, such as taught in U.S. Pat. No. 8,690,804, which is incorporated by reference in its entirety. However, any known type of plunger that can reciprocate at least partially below the deck 104 may be used.

The plunger of the compression device 118 may have a suction cup at an end portion, as shown in FIG. 1. However, examples of the disclosure are not limited to a suction cup and the plunger may have a blunt ending that abuts a chest of a patient and/or may attach to a patient using an adhesive.

One or more retention devices may be used to secure the patient to the deck 104. The retention device may include a flexible or rigid retention strap 122. In FIG. 1, the retention device includes a flexible retention strap 122 attached to the deck 104 by an actuator 124. FIG. 1 illustrates a flexible retention strap 122 which is composed of a harness structure that can attach to the deck 104 using any known means. The retention strap 122 assists in keeping the patient 108 from being displaced by the force of the compression device 118. Although FIG. 1 illustrates a flexible retention strap 122, as will be understood by one skilled in the art, the flexible retention strap 122 may include a rigid shell, similar to a back plate as discussed above in U.S. Pat. No. 8,690,804, that attaches to the deck 104 either directly or by one or more actuators 124.

The actuator 124 may be configured to regulate tension of the retention strap 122 in coordination or in conjunction with the compression device 118. For example, as shown in FIG. 1, the actuator 124 may be a spool that can rotate to contract the retention strap 122 or release the retention strap 122. However, examples of the disclosure are not limited to a spool and spool drive and the actuator 124 may be any actuator that can regulate tension of the retention strap 122.

Additional retention straps 122 or retention devices may be provided, that are either directly attached to the deck 104 or attached by an actuator 124. For example, a retention strap 122 may be provided across the legs of the patient 108 and be attached directly to the deck 104 using any known means, such as, but not limited to, tie downs, buckles, etc.

The patient support apparatus 100 can also include an alignment mechanism 126 in some examples. As will be discussed in more detail below, the alignment mechanism 126 can include a device to ensure that the compression device 118 is aligned with a desired spot on a patient such as by visually observing the compression point or otherwise sensing the compression point, and in some examples, the alignment mechanism 126 may include devices to move the compression device 118 and/or the deck 104. In FIG. 1, the alignment mechanism 126 is shown as a camera attached to the lower portion of the deck 104.

That is, the alignment mechanism 126 may include an optical or image sensor, such as, but not limited to, a camera. One or more cameras, such as discussed in U.S. Pat. No. 10,117,804, which is incorporated herein by reference in its entirety, may be placed near the compression device 118 to ensure that the patient 108 is in the appropriate position. While U.S. Pat. No. 10,117,804 shows the camera within a support structure for the compression device, examples of the disclosure can incorporate the camera near the compression device 118, as will be understood by one skilled in the art.

Additionally or alternatively, the alignment mechanism 126 can include a number of different types of mechanisms. In one example, the alignment mechanism 126 may be a mirror. The mirror can assist a rescuer in ensuring that the compression device 118 is aligned appropriately with the patient. For example, if the patient 108 is in a prone position, the rescuer can use the mirror to ensure that the compression device 118 is located at the appropriate position of the chest of the patient 108.

Additionally or alternatively, the alignment mechanism 126 may include a light over the patient support apparatus 100. The light may be suspended over the patient support apparatus 100 and aligned with the compression device 118. When the patient 108 is lying on the deck 104 or mattress 106, the light is projected on the patient at the location of the compression device 118. A rescuer can than adjust the patient 108 as needed to ensure alignment.

Additionally or alternatively, the alignment mechanism 126 may include a number of load cells, either within the mattress 106 or deck 104. The load cells may be used to indicate the position of the patient 108 and the patient 108 can be adjusted to ensure the patient 108 is in the correct position.

Additionally or alternatively, the alignment mechanism 126 can include mechanical guides on the top portion of the deck 104 or the mattress 106. In some examples, the mattress may include apertures to receive the alignment mechanism from the deck 104. The alignment mechanism 126 can be rods that extend up from the deck 104 or mattress 106 and align with a patient's axilla. The patient 108 can be placed on the mattress 106 or deck 104 so that their axilla align with the mechanical guides.

Additionally or alternatively, the alignment mechanism 126 may include one or more sensors. A sensor may be placed on a patient and a corresponding sensor may be located on an end portion of the compression device 118. The sensor placed on the patient may be located at a position compressions are desired or may be at any other fixed point away from the corresponding sensor, such as, but not limited to, the xiphoid process of the patient. One or more controllers, referred to herein as controller 128, can receive input signals from the sensors and determine if the sensors are in alignment to detect the position of the patient.

Additionally or alternatively, the alignment mechanism 126 may include not only an indicator of alignment, but also facilitate movement of the compression device 118 to ensure alignment. For examples, the compression device 118 may be adjustable to change the position of the compression point. The compression device 118 may move in a plane that is parallel to the deck 104, in at least one of the x-axis (longitudinal) direction or the y-axis (lateral) direction. For example, the compression device 118 may be adjustable as shown in U.S. Patent Publication No. 2019/0117501 or U.S. Patent Publication No. 2019/0117499, each of which is incorporated by reference in its entirety. The alignment mechanism 126 may adjust the position of the compression device 118 based either on an input from a user, such as through a user interface (not shown) or based on an output of one of the alignment mechanisms 126 discussed above, such as a camera, optical sensor, or load cells.

For example, a sensor may be placed on a patient at an anatomical landmark and the controller 128 can determine where to perform compressions based on the sensor location. An operator may be instructed to place the sensor on the xiphoid process of the patient and the controller 128 can adjust the alignment mechanism 126 based on the detected sensor. The controller 128 can continually or periodically monitor the sensor outputs to determine if the alignment mechanism 126 needs to be adjusted during operation. If multiple sensors are used, such as one on the patient and one on the compression device 118, the sensors do not need to physically align and may be intentionally mutually displaced in some examples.

The patient support apparatus 100 can also include a power source, such as a battery 130. However, in some examples, the power source of the compression device 118 is separate from the patient support apparatus 100. The battery 130 can be used to operate both the components of the frame 102 and the deck 104, such as moving the patient support apparatus 100 up, down, or providing tilting functions to the deck 104 by one or more frame actuators 112. The battery 130 is also used to provide power to the compression device 118. That is, all the electronic components on the patient support apparatus 100 can operate using a single battery 130. Although the controller 128 and battery 130 are indicated on a lower portion of the deck 104 for ease of illustration, the controller 128 and battery 130 may be included anywhere within the patient support apparatus 100.

The controller 128 can be used to operate the various electronics included within the patient support apparatus 100, such as, but not limited to, the frame actuators 112, the compression device 118, and the alignment mechanism 126.

The patient support apparatus 100 can include a number of sensors, such as one or more sensors for determining a depth of the compression provided by the compression device 118. The sensor may be provided on a chest of the patient 108 or the sensor may be provided on the compression device 118 itself. The sensors may be any known sensors, such as, but not limited to, accelerometers and electromagnetic sensors. For example, the sensors may be any of the sensors discussed in U.S. Pat. Nos. 10,179,086, 9,585,603, and/or 8,876,742, each of which is incorporated herein by reference. The controller 128 is able to receive the signals from the sensors and determine the compression depth using any of the disclosed examples.

In some examples, multiple sensors are provided to determine the depth of the compression. Although a retention strap 122 is provided to counteract the force of the compression device 118, the patient 108 may still move upward by the force of the compression device 118. Accordingly, a first sensor may be provided either on a back of a patient 108 and/or within the retention strap 122 and a second sensor may be provided on the point of compression of the patient 108. Using the displacement of both the first sensor and the second sensor, the controller 128 can determine the actual compression depth of the patient.

FIG. 2 illustrates a top view of the patient support apparatus 100 without a patient 108 present. In the example, shown in FIG. 2, an aperture 200 is provided in the deck 104 and/or mattress 106. Alternatively, in some examples, the mattress 106 does not include an aperture 200 but is made of a resilient material that will allow the compression device 118 to compress the chest of the patient. In some examples, a removable cover 208 may be provided over the aperture 200 in the mattress 106 or the deck 104 to cover the compression device 118 when not in use. A flexible or resilient membrane may be provided over the aperture 200 in some examples.

The removable cover 208 is not limited to the shape and size shown in FIG. 2. For example, the removable cover 208 may extend to one or both edged of the mattress 106 or deck 104 to allow the removable cover 208 to slide out from the side of the patient support apparatus 100. The removable cover 208 may be attached by rails or may be fit by friction. If the removable cover 208 is attached by rails, a locking mechanism may be provided to prevent the removable cover 208 from sliding out. The locking mechanism may be any known locking mechanism, such as, but not limited to, a latch, a hoop and loop fastener, buttons, snaps, zippers, etc.

Alternatively, in some examples, the removable cover 208 may form part of the end portion of the compression device 118. The removable cover 208 may be foldable, either manually or automatically, and used as an end point of the compression device 118, rather than a suction cup, as shown in FIGS. 1 and 2. When the compression device 118 is powered on, the removable cover 208 may automatically operate as an end portion of the compression device 118. In other examples, a user may remove the cover 208 and fold it and place it on the end of the compression device 118. When compressions are complete, the cover 208 can be unfolded and returned to position as part of the mattress 106 or the deck 104, either manually or automatically.

An end portion 202 of the compression device 118 can be seen in the aperture 200. If the deck 104 and the mattress 106 both include the aperture 200 and no membrane is provided, then the end portion 202 of the compression device 118 may include a suction cup, as shown in FIG. 1, or adhesive to attach to a patient 108. The end portion 202 may attach to the patient 108 in other ways, including an adhesive, or in some examples, the end portion 202 does not attach to the patient 108. The compression device 118 may be attached to one or more rails 204 as part of the alignment mechanism 126 that can be used to adjust the compression device in a plane parallel to the deck 104 in the directions of arrows 206. The compression device 118 may be moved along the rails 204 manually and may include a locking mechanism. Alternatively, the rails 204 may include a number of linear actuators that can be adjusted to change the position of the end portion 202 of the compression device 118, either in response to a user input or in response to a detection of the position of the patient 108.

Additionally or alternatively, the deck 104 may move by the rails 204, rather than or in addition to the compression device 118. In some examples, a different rail system similar to rails 204 may be provided for both the compression device 118 and the deck 104. The deck 104 may move manually along the rails 204 and lock in place, or alternatively, the deck 104 may move by actuators in response to a user input or a detected position of the patient.

Figure 3:
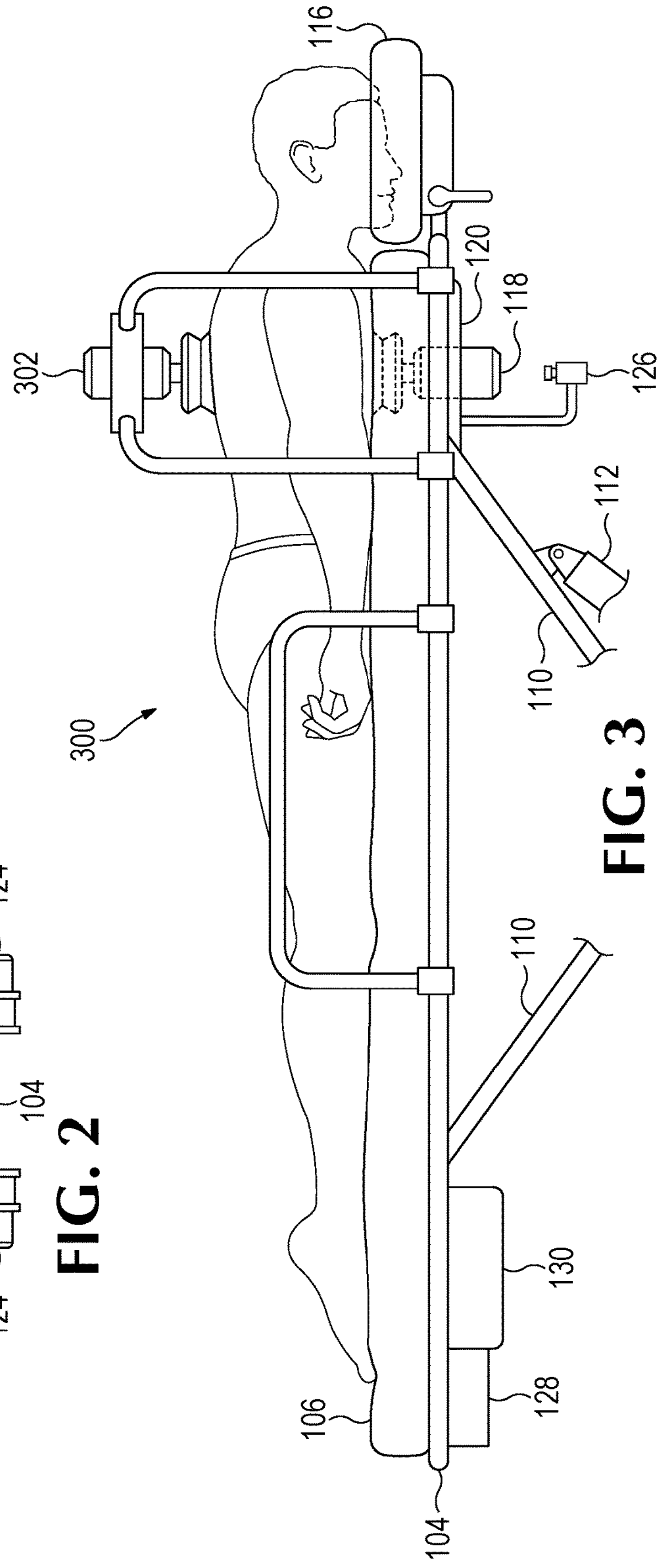
FIG. 3 is a side view of another patient support apparatus having multiple compression devices according to some examples of the disclosure.

FIG. 3 illustrates another example of a patient support apparatus 300. The patient support apparatus 300 may include a number of components that are similar or identical to those discussed above with respect to FIGS. 1 and 2. As such, those components are given the same reference numbers and are not discussed further with respect to FIG. 3.

In some examples, rather than or in addition to a retention device, such as, but not limited to, retention strap 122, a compression device 302 may be connected to the top portion of the deck 104. The compression device 302 may include any known compression device, such as, but not limited to, the compression device 302 discussed above in U.S. Pat. No. 8,690,804 or U.S. Publication No. 2019/0117502, which is incorporated herein by reference in its entirety. Using a known compression device 302, the compression device 302 can attach to the deck 104 or a railing of the patient support apparatus 300. A controller within the compression device 302 can either communicate with controller 128 of the patient support apparatus 300, or the controller 128 can control the compression device 302. In some examples, the controller of the compression device 302 could control the compression device 118 to allow the compression device 302 and the compression device 118 to operate in coordination. That is, compression device 302 and the compression device 118 may compress the patient 108 at the same time, or one device may begin a compression before another device has completed its compression.

The compression device 302 may attach to the patient 108 by a suction cup or adhesive and either compress or decompress the patient, as will be understood by one skilled in the art. The compression device 302 may attach to the patient using any known means, such as, but not limited to, an adhesive or a suction cup. The patient 108 may be positioned in either supine or prone orientation.

Figure 4A:
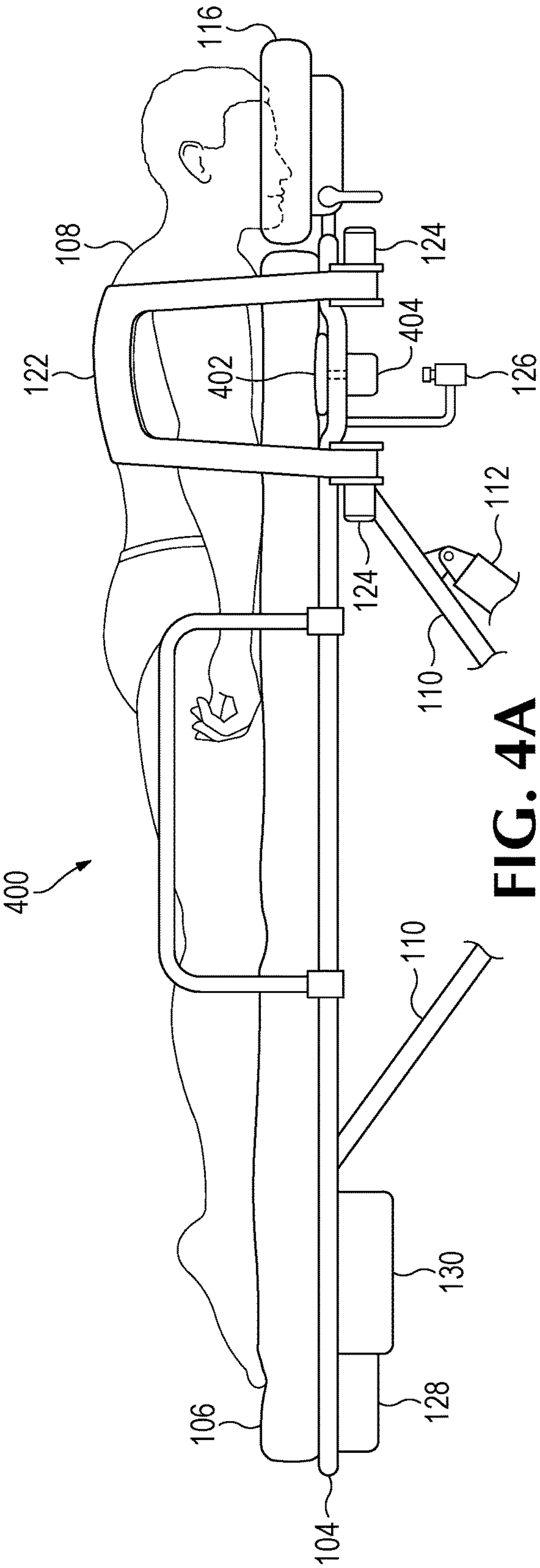
FIGS. 4A and 4B are alternative examples of another patient support apparatus having a compression device according to some examples of the disclosure.
Figure 4B:
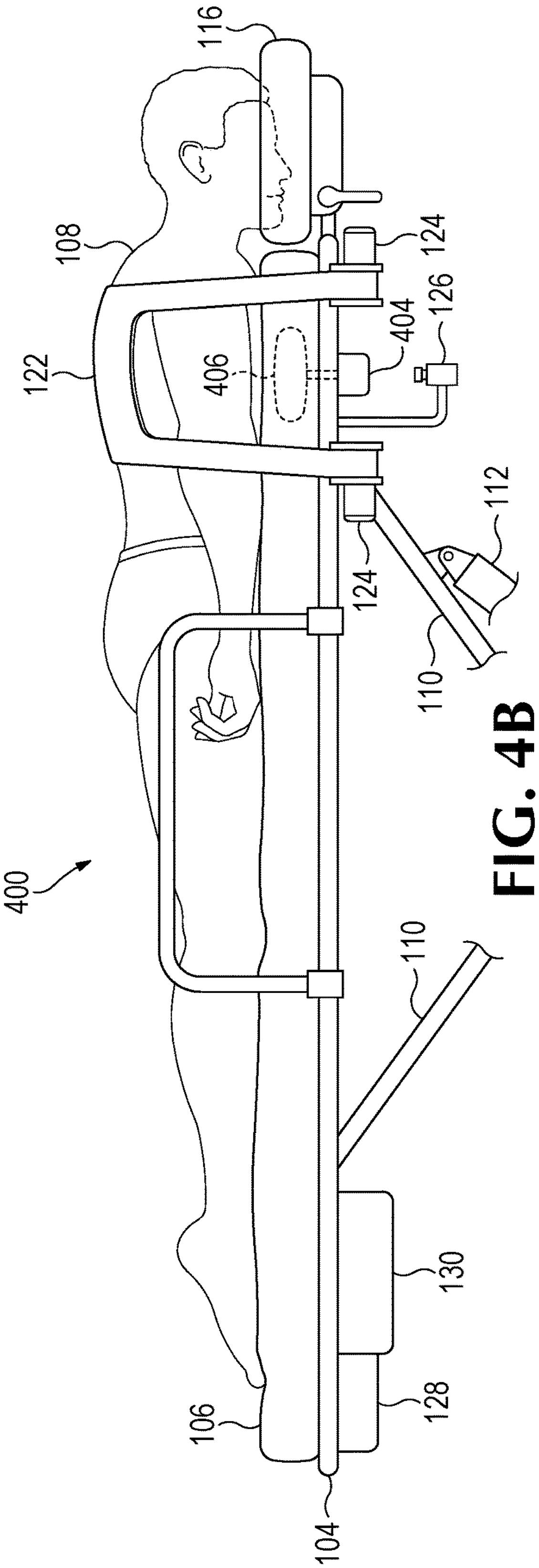

FIGS. 4A and B illustrate other examples of a patient support apparatus 400. The patient support apparatus 400 may include a number of components that are similar or identical to those discussed above with respect to FIGS. 1 and 2. As such, those components are given the same reference numbers and are not discussed further with respect to FIGS. 4A and 4B.

As mentioned above, examples of the disclosure are not limited to a plunger-type compression device 118, as shown in FIGS. 1-3. Any compression device that can cause the patient 108 to compress at the deck 104 may be used. In some examples, as illustrated in FIG. 4A, an inflatable bladder compression device 402 may be provided at the deck 104. The inflatable bladder 402 can be located between the mattress 106 and the deck 104. In some examples, the inflatable bladder 402 can be located within the mattress 106 itself, as shown by the optional inflatable bladder 406 in FIG. 4B.

A pneumatic mechanism 404 can fill the inflatable bladder 402 and/or inflatable bladder 406, if present, with a fluid, such as, but not limited to, air or other gas, to cause the inflatable bladder 402 and/or 406 to expand toward the patient 108 and compress the patient 108. The pneumatic mechanism 404 can deflate the inflatable bladder 402 and/or 406 by removing the fluid. As shown in optional inflatable bladder 406 configuration in FIG. 4B, the inflatable bladder 406 can be located in the mattress 106 in some examples, rather than or in addition to being located between the mattress 106 and the deck 104.

In some examples, the inflatable bladder 402 may be located below the deck in the same location as compression device 118 in FIG. 1. In such an example, the inflatable bladder 402 can be inflated by the pneumatic mechanism 404 to extend toward the patient through an aperture 200 in the deck 104. In such an example, the inflatable bladder 402 is inflated to extend through the aperture 200 to compress the patient, and then is deflated at least partially below the deck 104 at the end of the compression.

Additionally or alternatively, multiple inflatable bladders 402 may be provided either below the deck 104, between the deck 104 and the mattress 106, and/or within the mattress 106. The inflatable bladders 402 may be inflated in unison or the inflatable bladders 406 may be inflated one at a time to provide a compression to the patient 108.

The remaining features of the patient support apparatus 402 remain the same as those discussed above with respect to FIGS. 1-3 and the various alternatives. For example, any of the above adjustment mechanisms 126 discussed above can be included in the patient support apparatus 400. An additional compression device 302 may be provided over the top portion of the deck 104 to compress or decompress a patient.

Controller 128 in any of the examples shown in FIGS. 1-4 above can instruct the compression device 118 or the pneumatic mechanism 404 to perform the compression. The patient 108 may be in a prone or supine position. When in the prone position, the head support 116 can be provided for the face of the patient 108. The controller 128 can instruct the compression device 118 or the pneumatic mechanism 404 to operate in coordination with the retention device actuators 124. That is, the retention straps 122 may be retracted by the actuator 124 at the same time the compression device 118 extends toward the patient. In some examples, the retention straps 122 may be retracted after the compression device 118 has been extended, but before the compression device 118 is released.

When a patient is in a supine position, the compression by any one of the above-discussed compression devices, such as the compression device 118 or the inflatable bladders 402 and/or 406, can extend and compress the back of the patient. Additionally, as shown in FIG. 3, a compression device 302 may be provided to compress the chest of the patient when the patient is in the supine position.

Further, as mentioned above, the controller 128 may also receive information from the adjustment mechanism 126 if the adjustment mechanism includes one or more sensors and/or actuators discussed above. The controller 128 can perform an operation, such as adjusting the compression device 118, pneumatic mechanism 404, and/or the deck 104 or output information based on the received signals from the adjustment mechanism 126.

In some examples, the retention strap 122 can be retracted by the actuators 124 at the same time as the compression device 118 compresses the patient 108 or the inflatable bladder 402 is filled with fluid to compress the patient 108. In other examples, the controller 128 may cause the retention strap 122 to be retracted at a time different from when the compression device 118 extends toward the patient 108 or the inflatable bladder 402 inflates.

The controller 128 may also determine a depth of compression using one or more compression depth sensors, as discussed above. The compression depth may be output to a user in some examples.

Figure 5:
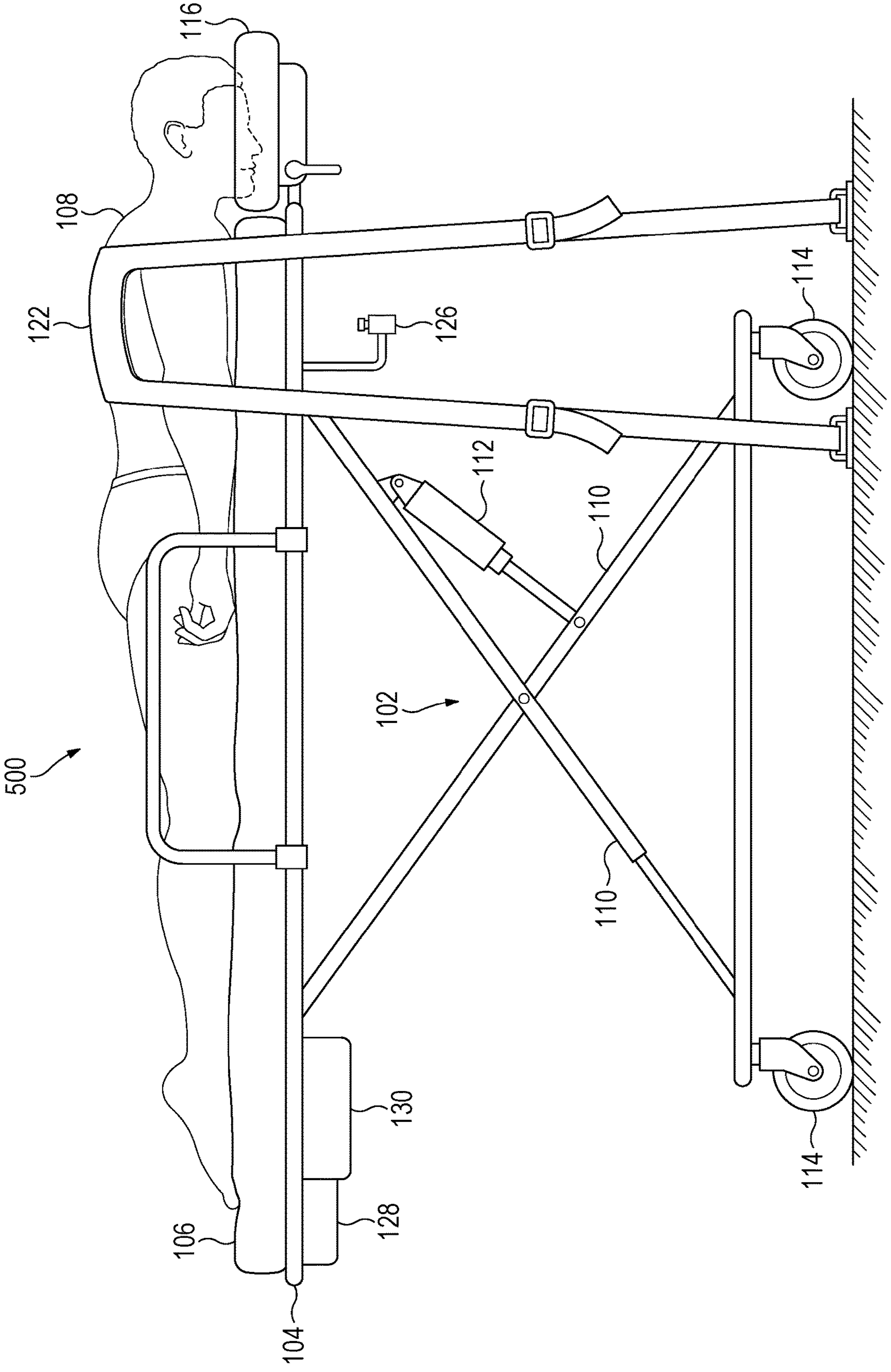
FIG. 5 is an alternative example of a patient support apparatus for providing compressions to a patient.

In an alternative example, rather than or in addition to the compression device 118, the retention device straps 122 may attach to a surface that does not move with the frame actuators 112, such as outside the patient support apparatus 500, as shown in FIG. 5, or an anchor located at the lower portion of the frame 102 that does not move with the frame actuators 112, such as, but not limited to, near the wheels 114. The controller 128 can instruct the frame actuators 112 to move the frame up and down relative to the ground. The retention strap 122 may attach to the ground surface, as shown in FIG. 5, or the retention strap 122 may attach to another surface outside the patient support apparatus 500.

Since the retention strap 122 is attached to a surface outside the patient support apparatus 500, when the controller 128 instructs the frame actuators 112 to move upward, the patient 108 is compressed against the retention strap 122. The patient 108 compression is released when the frame actuators 112 move downward.

Additionally or alternatively, the various other components of the patient support apparatus 100 can be included. Although not shown, the compression device 118 and/or the inflatable bladder 402 may also be provided with the patient support apparatus. The controller 128 can operate the compression device 118 or the pneumatic mechanism 404 to cause a compression on one side of the patient while the frame actuators move the deck 104 upward to cause compression on the other side of the patient 108 by the retention strap 122. Additionally, the controller 128 can operate so that the provided compressions by the retention strap 122 and the compression device 118 or pneumatic mechanism 404 are offset from each other.

Figure 6:
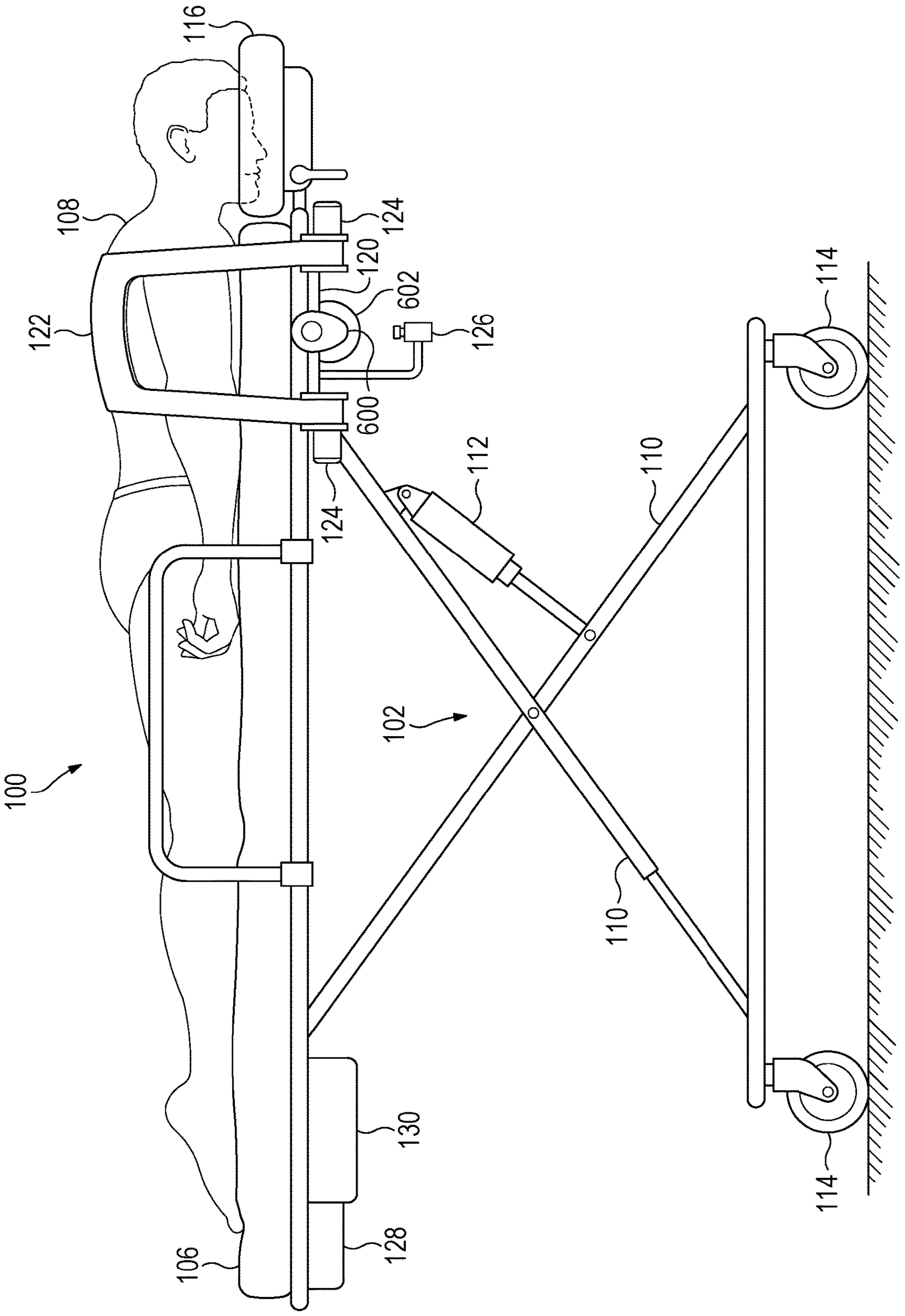
FIG. 6 is an alternative example of a patient support apparatus for providing compressions to a patient.

FIG. 6 illustrates an alternative compression device 600 that can be included in the patient support apparatus 100. In the example of FIG. 6, rather that the linear actuator compression device 118 of FIG. 1, a rotating cam 600 having a lobe can be attached to the deck 104 of the frame 102. The cam 600 can be attached to the deck using any known attachment components.

A motor 602 rotates the cam. As the cam 600 rotates, the lobe rotates and pushes up toward the patient 108 to provide a compression to the patient 108 and then rotates away from the patient 108. The rate of compressions can be controlled by controlling the speed of the motor 602.

Similar to other examples discussed above, the rotation of the cam 600 can operate in conjunction with the tension regulation of the retention strap 122. The cam 600 can also be used with all of the alignment mechanisms 126 discussed above with respect to FIG. 1. The cam 600 lobe's protrusion may be between 40-60 millimeters (mm). In some examples, the cam 600 can have a composite structure with a rigid lobe and soft circular segments.

Controller 128 can instruct the motor 602 to rotate so that the cam 600 lobe is facing toward the ground when not in use. In some examples, the cam 600 may be fixed to the frame 102 or deck 104. However, in other examples, the cam 600 may be retractable or otherwise hinged. When in use, the entire cam 600 can be rotated or hinged toward a patient 108 until the circular portion of the cam 600 is in contact with the patient 108 with the lobe facing toward the ground. Rotating or hinging the cam 600 toward the patient 108 from the retracted position can be performed manually or automatically based on a signal from the controller 128. Once in position, the controller 128 can instruct the motor 602 to rotate to provide compression with the lobe of the cam 600.

Figure 7:
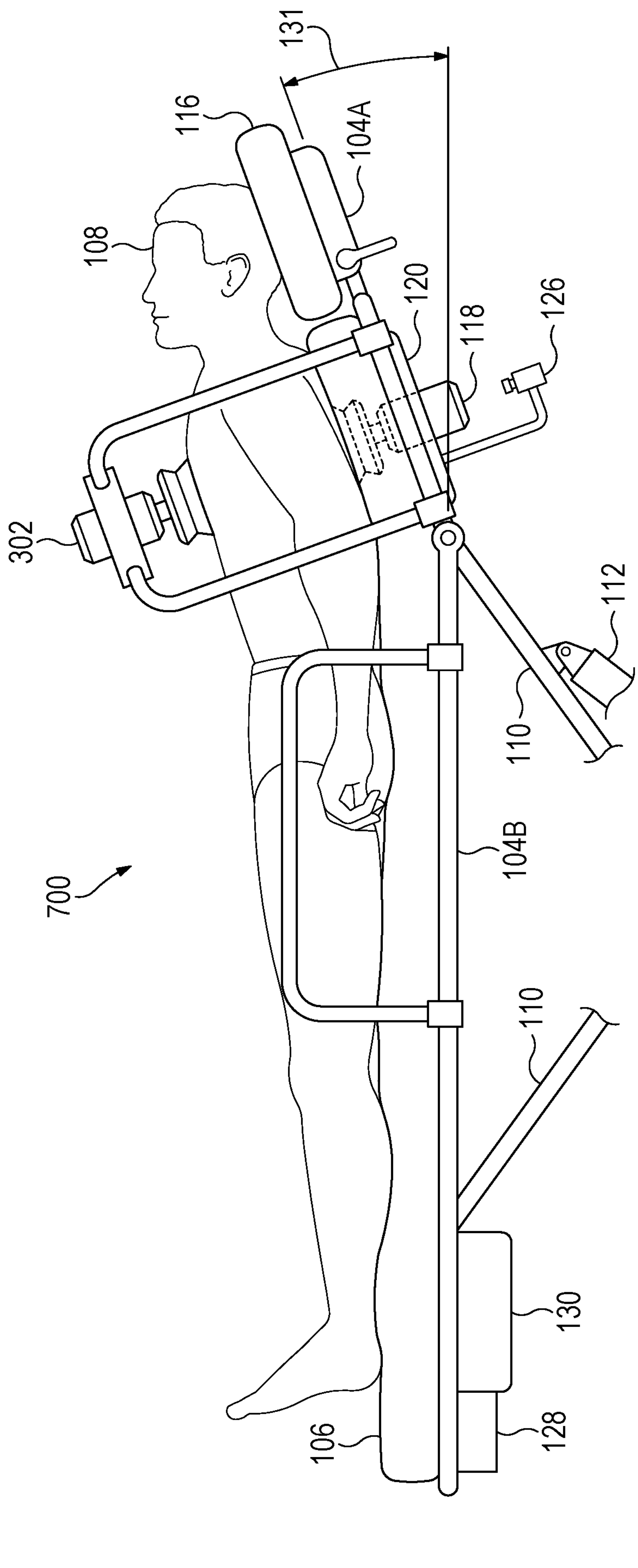
FIG. 7 is an alternative example of a patient support apparatus for providing compressions to a patient.

FIG. 7 is an alternative example of a patient support apparatus 700 for providing compressions to a patient 108. As illustrated in FIG. 7, in a variation an upper portion 104A of the deck is configured to incline the torso or chest of the patient 108 at an angle of inclination 131, while the legs of the patient 108, supported on a lower portion 104B of the deck, remain substantially parallel to the support surface (i.e. the ground) upon which the patient support apparatus 700 rests. The angle of inclination 131 is an acute angle and can be varied by repositioning the upper portion 104A of the deck. Preferably, the angle of inclination 131 is between about five degrees and about forty degrees. More preferably, the angle of inclination 131 is between about five degrees and about thirty-five degrees. Even more preferably, the angle of inclination 131 is between about ten degrees and about twenty degrees. The variation illustrated in FIG. 7 may be especially useful in configurations where the patient 108 is in the supine position, although it can also be used where the patient 108 is in the prone position. The variation illustrated in FIG. 7 may be used with any of the compression devices described above, including, as examples, the compression device 118 of FIGS. 1 and 3, the inflatable bladders 402 or 406 of FIGS. 4A and 4B, or the compression device 302 of FIG. 3. Other features of FIG. 7 that are not discussed here are as discussed above for other example configurations.

As noted above, the head support 116 may be attached to the frame 102 by a locking hinge, allowing the head support 116 to be rotated about the hinge. Accordingly, in configurations the angle of inclination 131 of the head support 116 may be either greater than or less than the angle of inclination 131 of the upper portion 104A of the deck.

The examples discussed above can allow for an always available CPR function for a patient support apparatus, especially patients which may be better served in a prone position. The patient can be secured to the patient support apparatus which will prevent the patient from drifting. Examples of the disclosure are not limited to the compression devices discussed above, specifically a plunger-type compression device, inflatable bladder, and rotating cam. Any type of compression device that can be mounted at a deck 104 to compress the patient 108 may be used.

For purposes of this description, certain aspects, advantages, and novel features of the examples of this disclosure are described herein. Features, integers, characteristics, compounds, chemical moieties or groups described in conjunction with a particular aspect, configuration, or example of the disclosure are to be understood to be applicable to any other aspect, configuration or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The disclosure is not restricted to the details of any foregoing examples. The disclosure extends to any novel one, or any novel combination, of the features disclosed in this specification (including any accompanying claims, abstract and drawings), or to any novel one, or any novel combination, of the steps of any method or process so disclosed.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods.

As used herein, the terms "a", "an", and "at least one" encompass one or more of the specified element. That is, if two of a particular element are present, one of these elements is also present and thus "an" element is present. The terms "a plurality of" and "plural" mean two or more of the specified element. "Generally" or "approximately" as used herein means a variance of 10%.

As used herein, the term "and/or" used between the last two of a list of elements means any one or more of the listed elements. For example, the phrase "A, B, and/or C" means "A," "B," "C," "A and B," "A and C," "B and C," or "A, B, and C."

As used herein, the term "coupled" generally means physically coupled or linked and does not exclude the presence of intermediate elements between the coupled items absent specific contrary language.

Additionally, this written description makes reference to particular features. It is to be understood that the disclosure in this specification includes all possible combinations of those particular features. Where a particular feature is disclosed in the context of a particular aspect or example, that feature can also be used, to the extent possible, in the context of other aspects and examples.

Also, when reference is made in this application to a method having two or more defined steps or operations, the defined steps or operations can be carried out in any order or simultaneously, unless the context excludes those possibilities.

Although specific examples of the disclosure have been illustrated and described for purposes of illustration, it will be understood that various modifications may be made without departing from the spirit and scope of the disclosure. Accordingly, the disclosure should not be limited except as by the appended claims.

We claim:

1. A patient support apparatus, comprising:

a frame including a deck structured to support a patient;

a retention device structured to secure the patient on the deck; and a cardiopulmonary resuscitation (CPR) compression device attached to the frame at the deck, the compression device including a compression mechanism that includes a reciprocating plunger configured to deliver chest compressions to the patient, the reciprocating plunger structured to retract at least partially below the deck.

2. The patient support apparatus of claim 1, wherein the frame further includes a head rest structured to support a head of the patient in a prone position on the deck.

3. The patient support apparatus of claim 1, wherein the deck includes a compression aperture.

4. The patient support apparatus of claim 3, wherein the compression aperture includes a membrane covering the aperture.

5. The patient support apparatus of claim 4, wherein the deck includes a removable cover on the compression aperture.

6. The patient support apparatus of claim 1, wherein the retention device is rigid.

7. The patient support apparatus of claim 1, further comprising a retention device actuator operatively connected to the retention device and configured to regulate tension of the retention device.

8. The patient support apparatus of claim 7, further comprising a controller configured to drive the retention device actuator to regulate tension of the retention device in coordination with the compression mechanism.

9. The patient support apparatus of claim 1, wherein at least one of the compression device and the deck is structured to adjust in a plane parallel to the deck to adjust a compression point.

10. The patient support apparatus of claim 1, further comprising a sensor configured to detect a compression depth.

11. The patient support apparatus of claim 1, further comprising a power source configured to provide power to the compression device.

12. The patient support apparatus of claim 1, wherein the compression device is a first compression device, and the patient support apparatus further comprises a second compression device attached to the frame above the deck.

13. The patient support apparatus of claim 1, wherein the compression device includes an alignment mechanism.

14. The patient support apparatus of claim 1, further comprising at least two retention straps coupled to the frame, each retention strap structured to secure the patient on the deck.

* * * * *